Dec. 4, 1962 N. E. HILL 3,067,316
ELECTRICAL DUCT HEATER
Filed May 20, 1960 2 Sheets-Sheet 1

NAPOLEON E. HILL
INVENTOR.
BY Daniel A. Botis
Atty

NAPOLEON E. HILL
INVENTOR.

BY Daniel H. Bobis
Atty 3,067,316
ELECTRICAL DUCT HEATER
Napoleon E. Hill, Waukesha, Wis., assignor to Worthington Corporation, Harrison, N.J., a corporation of Delaware
Filed May 20, 1960, Ser. No. 30,482
4 Claims. (Cl. 219—39)

This invention relates to a duct type heating system and more particularly to an individually controlled electrical heating means which is disposed in the duct work to provide the total heat for a specific area or the auxiliary heat to an area receiving inadequate heat from the primary heating system.

In the common type of heating system, air heated by a boiler or the like is circulated through the duct work by a blower element. A system such as the foregoing is usually designed to maintain a predetermined temperature range in each of the areas to be heated. However, in some cases this primary heating system is not capable of providing the required temperature range to certain of these areas. More particularly, it is evident that such a condition will present itself when the heat needed extends beyond the design limitations of the heating system. One such situation comes to mind in an installation embodying the above type heating system wherein one or more areas to be heated are added thereto. Accordingly, in order to avoid the above-mentioned objections, it is desirable to provide individual heating elements which are accommodated by the duct work to act as auxiliary heating means. There are a number of such heating means currently employed in the art for the above purpose which, together with the present invention are generally based on the same fundamental conception. Thus they have a primary heating system supplying heated air through the usual duct work to various areas and include electrical heating means in the individual areas which supplement the primary source should same be inadequate to provide the necessary or required temperature range.

While the foregoing indicates that the electrical heating means is used as an auxiliary heating device, it is not intended to be limiting as it will be readily understood by one skilled in the art that the contemplated heating means can just as easily be used as a primary heating system.

Within the broad limits just defined there is much room for improvement in the individually controlled heating means. From a practical standpoint the usual heating means includes components which provide the required temperature range but, in meeting other requirements such as maintaining temperatures of the housing of the heating means below set levels, embody elements which are complex and expensive to manufacture.

To accomplish the foregoing limitation of excessive temperatures in the housing of the heating means, the present invention contemplates the coordination and positioning of elements which are old in the art, such as limit and fan controls, relative a novel housing means which is readily installed in the usual duct work to provide an electrical heating element of the auxiliary type, which is readily incorporated into the primary duct work.

Accordingly, it is an object of this invention to provide an improved heating means which has relatively few parts and hence can be manufactured at less cost.

It is another object of this invention to locate the controls associated with the heating means in such fashion whereby they coact to limit air temperature and surface temperature of the duct in proximate relation to the heating means.

It is a further object of this invention to provide an auxiliary electrical heating means which can be incorporated into the duct work of a primary heating system without costly redesign.

It is another object of this invention to provide a housing and liner arrangement having a space therebetween to permit a predetermined amount of air to pass therethrough for temperature reduction purposes.

It is another object of this invention to provide heating means which function to control the temperature in individual rooms or areas when a control duct system is employed.

It is a further object of this invention to provide a heating means which is easily embodied in a duct type heating and cooling systems.

With the foregoing objectives in view, and others as may appear from the accompanying specification, the invention consists of various features of construction and combination of parts, which will be first described in connection with the accompanying drawings.

Figure 1:
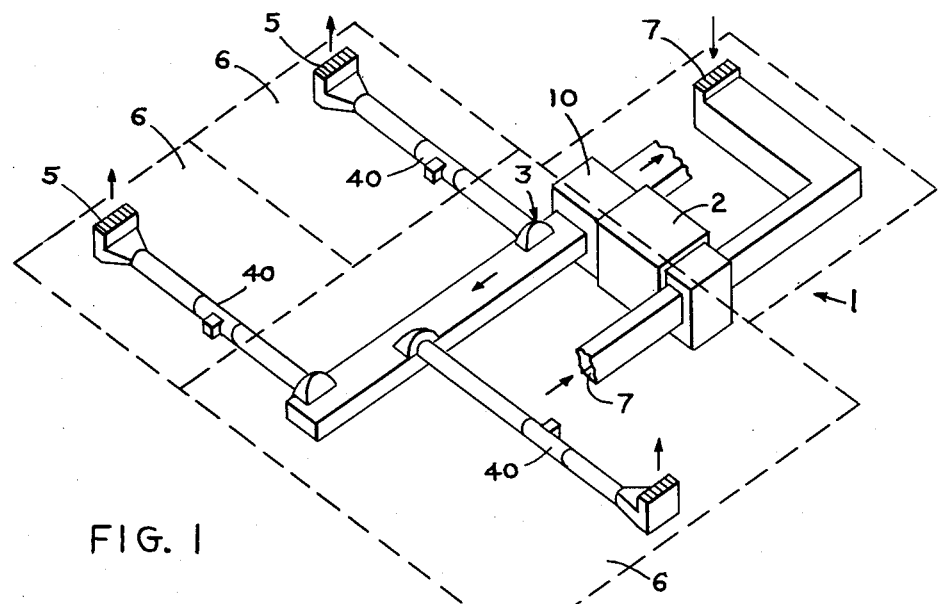
FIGURE 1 is a schematic arrangement of a central duct system embodying the heating elements contemplated herein.

Referring to the drawings, FIGURE 1 shows a typical forced air heating system generally designated 1 including the usual furnace 2 for providing heated air to the areas or rooms to be heated through the duct system 3. As is well known, heated air is flowed by blower 10 through duct outlets 5 to the areas 6. The furnace 2 receives cool air through the usual registers or inlet means 7.

As was mentioned hereinabove, in the event that it is necessary to provide a temperature range which exceeds the design limitations of primary heating system 1, it is customary to include individual electrical heating means designated 40 in the areas 6. These heating means 40 can be responsive individually to the temperature of the area with which they are associated or actuated into operation by a single thermostat.

Figure 2:
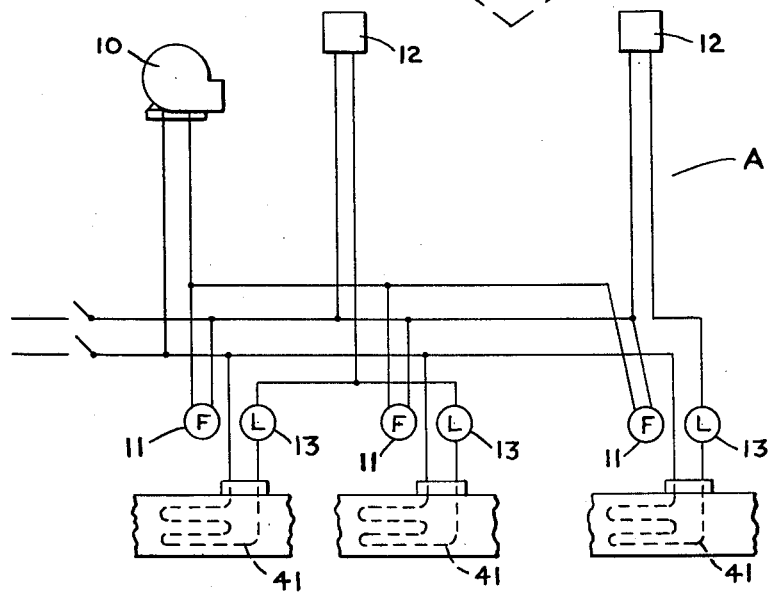
FIGURE 2 is a schematic diagram of a typical control circuit which can be used to control the electrical heating means.

By way of example, a typical control circuit A is shown in FIGURE 2 which adequately provides the zone type control preferred. Thus the blower 10 is actuated into operation by any of the fan switches 11. The usual dampers (not shown) may be installed in the duct work to proportion the quantity of air passed to predetermined areas. In similar fashion, thermostats 12 may be connected to each of the electrical heating elements 41 to operate same when the temperature in a particular area falls below a desired level. The usual limit switch 13 responsive to temperature in the heating means 40 is normally closed and set to open and thusly shut down the element 41 when the air temperature and duct surface temperature in the vicinity of the heating means exceeds a predetermined level.

Thus far, the structure and operation of the air heating system that has been described is relatively well known to those familiar with this art and it will be understood that such components do not form an essential part of the invention but are present to form an operable installation. However, what now follows is a description of the component parts and operation of the auxiliary electrical heating means 40 which is considered to be the crux of the present invention.

The Electrical Heating Means

Figure 3:
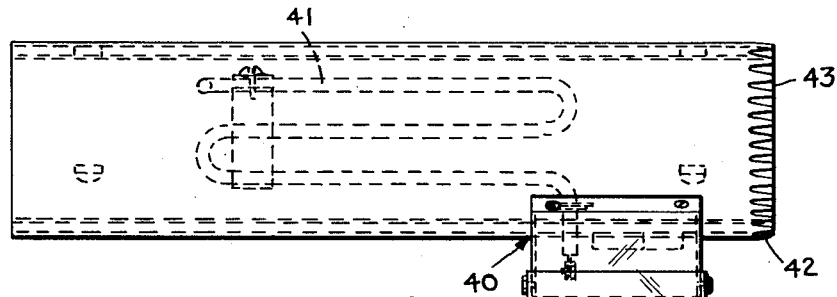
FIGURE 3 is a top view of the individual heating means showing the side portion of the control box.
Figure 4:
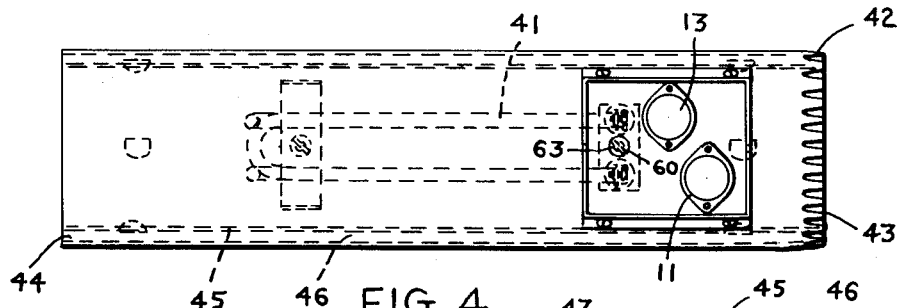
FIGURE 4 is a top view of the heating means looking directly over the control box.
Figure 5:
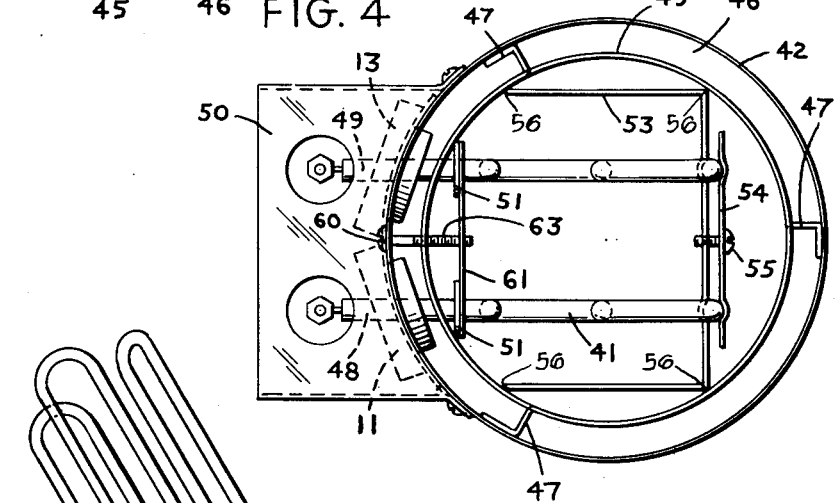
FIGURE 5 is a side view of the heating means contemplated herein.
Figure 6:
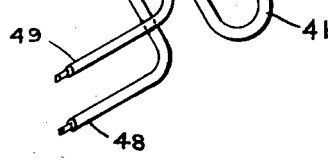
FIGURE 6 is a perspective view of the preferred form of electrical element embodied in the heating means.

Referring to FIGURES 3, 4 and 5 which illustrate one embodiment of the electrical heating means 40, the numeral 42 designates the casing or housing shaped to conform to the duct work with which it is to be associated. Male and female ends such as at 43 and 44 are provided for housing 42 to permit connection of same into the duct work. A liner 45, preferably constructed of any heat reflecting substance known in this art, is disposed in essentially concentric relation with the housing to form an annular space 46 therewith which has an area between 15% and 35% of the area of the housing 42.

The desired spacing is maintained by punching a plurality of tongue-like members 47 out of the liner 45 and shaping the tongue members 47 in the form of an angle so that the free leg of said angle may be spotwelded to the inner periphery of the housing as is clearly shown in FIGURE 5 of the drawings.

With the above arrangement it is evident that annular space 46 provides a room wherein air, which is of lesser temperature than that acted upon by heating element 41, may flow to thusly reduce the temperature of the housing 42, to thereby serve as a cooling passage.

While a single passageway is shown it is believed clear that plural passageways could be constructed in accordance with the teachings herein to provide for an even greater insulation to preclude heat transfer from the inner portion of liner to the outer surface of the housing.

The heating element 41 is disposed in the interior portion of liner 45 so that it is generally concentric with the perimeter of the liner. Disposition as above described reduces resistance effect element 41 will have on air flowing through the liner. As is shown in FIGURE 5 of the drawings the terminals 48 and 49 of the element 41 are positioned in a control box 50 mounted on the housing 42 near the downstream end thereof. The element 41 is mounted on the housing in any well known fashion.

In the preferred form a mounting location 60 is formed on the housing 42 to form one end of the means for mounting the electrical heating element as described above. The other end of the mounting means comprises a finger-like plate 61 which is disposed beneath washers 51. Screw means 63 is connected to plate 61 and coacts with location 60 to bring the washers 51 into abutment with the liner as is shown in FIGURE 5 to thusly provide the desired spacing of the heating element in the linear at the terminal end. The electrical heating element 41 is preferably sheathed. However, it will be understood that said element may be formed of wire or other bare resistor in which event suitable insulators will be provided in a manner well understood in the art.

U-shaped spacing bracket 53 is mounted on the end of the electrical heating element remote from the terminals and held thereon by clamp-like member 54 and screw means 55. With this arrangement the heating element is supported at the bend thereof and desired relation relative liner wall is provided by the abutting portions 36 of said spacing bracket 53.

Limit switch 13 responsive to temperature is mounted in the control box 50 and on the downstream side of elements 41. This limit switch is preferably set in normally closed position but to open at a particular temperature thusly breaking the circuit to the element 41 when temperatures in the housing become excessive.

Fan control 11 is preferably connected in control box 50 adjacent the limit switch to cause the blower to flow air through the electrical heating means in accordance with a predetermined plan of operation.

The above described heating element provides an inexpensive and easily installed auxiliary heating means which coacts in providing regulation of temperature in different rooms in efficient and automatic fashion.

It will be understood that the invention is not to be limited to the specific construction or arrangement of parts shown and that they may be modified within the limits of the claims.

What is claimed is:

1. A heating means for use in a duct of an air heating system including a blower for circulating air through said air heating system, said heating means including a housing having substantially the same shape as the duct, a liner of same shape as said housing disposed concentrically within said housing, said liner having unitary spacer members about the outer periphery thereof and said spacer members abutting said housing to maintain said liner a spaced distance from said housing to form a cooling passage therewith, said cooling passage having an area at least 15% and no more than 35% of the area of said housing, a heating passage formed in the inner portion of said liner and said heating passage having upstream and downstream ends, an electrical heating element disposed within the heating passageway and having the terminals thereof connected to the outer portion of the housing and at the downstream end of said heating passage, said electrical heating element includes a free end remote from the terminals and means for connecting the terminals to said housing comprising a plate member disposed about the terminals, washer members disposed about said terminals and between the plate member and the inner portion of said liner, a connecting member disposed in said plate member at one end and in said housing at the other end to maintain said washer members in abutting relation with the inner portion of said liner, a limit switch connected to the electrical heating element and said limit switch disposed on said housing and in proximate relation to the terminals, and switch means connected to said blower and said switch means mounted on said housing in proximate relation to the limit switch.

2. The heating means claimed in claim 1 wherein a U-shaped bracket is mounted on the free end of said electrical heating element to space said electrical heating element relative said heating passage, and said means for connecting the terminals to said housing and said U-shaped bracket coact to fix said heating element in said heating passage in concentric relation therewith.

3. Means for heating a first and second zone, said means including a blower, a first and second duct each having inlets connected to said blower and outlets opening into each of said zones, duct means for returning air from the first and second zone to said means for heating the first and second zone, heating means in each of said ducts and said heating means including a housing having substantially the same shape as the duct, a liner of same shape as said housing disposed concentrically within said housing, said liner having unitary spacer members about the outer periphery thereof and said spacer members abutting said housing to maintain said liner a spaced distance from said housing to form a cooling passage therewith, said cooling passage having an area at least 15% and no more than 35% of the area of said housing, a heating passage formed in the inner portion of said liner and said heating passage having upstream and downstream ends, an electrical heating element disposed within the heating passageway and having the terminals thereof connected to the outer portion of the housing and at the downstream end of said heating passage, said electrical heating element includes a free end remote from the terminals and means for connecting the terminals to said housing comprising a plate member disposed about the terminals, washer members disposed about said terminals and between the plate member and the inner portion of said liner, a connecting member disposed in said plate member at one end and in said housing at the other end to maintain said washer members in abutting relation with the inner portion of said liner, means in each of the zones and connected to the electrical heating means and blower to actuate same to "on" or "off" position to regulate the temperature in said zone, a limit switch connected to the electrical heating element and said switch disposed on said housing and in proximate relation to the terminals, and switch means connected to said blower and said switch means mounted on said housing in proximate relation to the limit switch.

4. The combination claimed in claim 3 wherein a U-shaped bracket is mounted on the free end of said electrical heating element to space said electrical heating element relative said heating passage, and said means for connecting the terminals to said housing and said U-shaped bracket coact to fix said electrical heating element in said heating passage in concentric relation therewith.

References Cited in the file of this patent

UNITED STATES PATENTS

| | | | |
|---|---|---|---|
| 427,574 | Howard | May 13, | 1890 |
| 1,560,377 | Daley | Nov. 3, | 1925 |
| 2,022,453 | Ball | Nov. 26, | 1935 |
| 2,023,622 | Textorius et al. | Dec. 10, | 1935 |
| 2,471,784 | Seifner et al. | May 31, | 1949 |
| 2,712,588 | Epstein | July 5, | 1955 |
| 2,839,659 | Cotts et al. | June 17, | 1958 |
| 2,980,785 | Whitney | Apr. 18, | 1961 |